United States Patent Office 3,364,201
Patented Jan. 16, 1968

3,364,201
CARBONACEOUS POLYSACCHARIDE MATERIAL AND METHOD OF MAKING IT
Tom R. Thomson, Scottsdale, Ariz., assignor to Research Corporation, New York, N.Y., a non-profit corporation of New York
No Drawing. Filed Mar. 15, 1965, Ser. No. 439,944
3 Claims. (Cl. 260—233.3)

ABSTRACT OF THE DISCLOSURE

Hard water insoluble black spherical granules, useful as pigments, fillers adsorbents and the like, are produced by treating dry starch granules with hydrogen chloride gas until the carbon content of the granular reaction product is at least about 50%.

This invention relates to a novel carbonaceous material and to a method of making it.

The invention is based on the discovery that when polysaccharide substances, such as starch and cellulose, are subjected to the action of substantially anhydrous hydrogen chloride at temperatures from room temperature and below to about 100° C., after a rather long period of time, which is greater the lower the temperature, during which the major action appears to involve first a disorganization, presumably through rupture of hydrogen bonds by the hydrogen chloride, followed by a certain amount of bond rupture and degradation of the polysaccharide molecule, a dehydrative condensation begins to take place with gradual increase of carbon content of the reactant and decrease in its solubility in water producing black reaction products which are useful as pigments, fillers, adsorbents and the like.

Of particular utility are products having a carbon content of 50% and over.

The method and products of the invention will be more particularly described by way of illustration with reference to the treatment of starch by the method of the invention. The optimum temperature for the treatment of starch is about 70° C.

When dry starch granules, such as potato starch, are treated with anhydrous hydrogen chloride by passing hydrogen chloride into a container in which the starch is subjected to agitation or through a container containing unagitated starch, the color of the starch gradually deepens through tan, malt-colored, light brown and dark brown to black. During the first part of the reaction (before the black stage) microscopic examination reveals signs of partial penetration of the hydrogen chloride into the granules. This is evidenced by the swelling of the outer part of the granule when treated with cold water, leaving an intact inner portion that still shows the characteristic interference pattern of starch under polarized light. The water swells the outer part and extracts all of the color from it leaving a pure white inner granule behind. Further reaction shows more and more penetration of water with smaller and smaller residual inner granules.

By the time the reaction has proceeded to the stage where the hydrogen chloride has reached the center of the granule, the entire granule swells rapidly on contact with cold water and eventually completely dissolves. An outer membrane seems to be left over which is apparently less soluble in water. The starch is almost black at this stage which typically requires about 8–12 hours at 70° C.

Soon thereafter, a noticeable change in the product with reaction time is observed. The products are black, the color is no longer extractable with water, and the amount of water-extractable material becomes less and less, eventually becoming zero, at which stage the starch is completely water-insoluble. Measurements on the dry, reacted granules indicate that the size of the granule decreases during this part of the reaction, and also becomes more perfectly spherical. The electron microscope shows this same effect and also shows the surface of the granule to be very smooth compared to the original starch. The material also develops hardness and a gritty texture when ground between glass plates, unlike the original starch. All of this indicates some tightening up of structure of the granule.

During this stage there is also evidence of water elimination. Chemical evidence indicates this not to come from the reaction of HCl with hydroxyl groups, but rather from hydroxyl groups of one molecule forming ether linkages with another hydroxyl group on another molecule, thus tying the two molecules together in a cross-link. This could well explain the "tightening" up of structure that is observed.

The resulting product is a granule that is hard, spherical, completely black, chemically rather inert, insoluble in most common solvents including water, and somewhat smaller in diameter than the original granules.

Reaction to this stage is typically completed in not more than about 100 hours at 70° C. After about 60 hours, for example, the carbon content is about 57.7% as compared with the 44.4% carbon content of the original starch. Products of higher or lower carbon contents may be produced by varying the time or temperature of the reaction. The size of the resulting granules depends on the size of the original starch granules. Finer granules are obtained from rice starch which has small granules than from potato starch, the granules of which are relatively large. By selection of starches of suitable granule size, black carbonaceous granules in sizes ranging from about one to one hundred microns can be prepared. By suitable means, such as air-classification, the starch could be separated into fractions more uniform in size to yield accordingly uniform-sized products.

I claim:
1. A carbonaceous product consisting of hard water-insoluble black spherical granules having a carbon content of at least about 50% produced by the treatment of dry starch granules with hydrogen chloride gas at a temperature from room temperature to below about 100° C.
2. A product as defined in claim 1 wherein the treatment of the starch granules with hydrogen chloride is effected at a temperature of about 70° C.
3. A carbonaceous product as defined in claim 1 wherein the granules have a size in the range from about 1 to about 100 microns.

References Cited
UNITED STATES PATENTS 3,175,928  3/1965  Lancaster et al. _____ 97—38
3,236,673  2/1966  O'Connor et al. _____ 106—288

DONALD E. CZAJA, Primary Examiner.
R. W. MULCAHY, Assistant Examiner.